June 30, 1936.    W. RICHTER    2,045,803
WELDING APPARATUS
Filed Aug. 26, 1935

INVENTOR.
Walther Richter
BY
ATTORNEY.

Patented June 30, 1936

2,045,803

UNITED STATES PATENT OFFICE 2,045,803

WELDING APPARATUS

Walther Richter, Wauwatosa, Wis., assignor to A. O. Smith Corporation, Milwaukee, Wis., a corporation of New York Application August 26, 1935, Serial No. 37,876

5 Claims. (Cl. 219—8)

The present invention relates to apparatus for the automatic feeding of a weldrod toward the work in the performance of an arc welding operation in which the weldrod constitutes one electrode and the work the other electrode of a welding arc.

More particularly, the present invention relates to such arc welding apparatus employed in connection with direct current welding arcs.

An object of the invention is to provide an automatically acting weldrod feeding device by which a weldrod is fed toward the arc in accordance with a characteristic of that arc.

A further object of the invention is to provide such a device which is extremely sensitive in its operation and which is capable of maintaining the said arc characteristic within very narrow limits.

The present invention is particularly adapted to be used in conjunction with weldrod feeding devices employing an interruptible clutch or other similar means for feeding the weldrod in increments of advance in accordance with a characteristic of the arc and provides a means of so regulating such a feeding device as to obtain a very close regulation of the arc by procuring a full range of speeds of feed within any desired amount of change of said arc characteristic.

A further object of the invention is to prevent hunting of the apparatus and the resulting imperfect arc control.

Further objects will become apparent as the description of the invention proceeds and from a study of the drawing of which:

Figure 1:
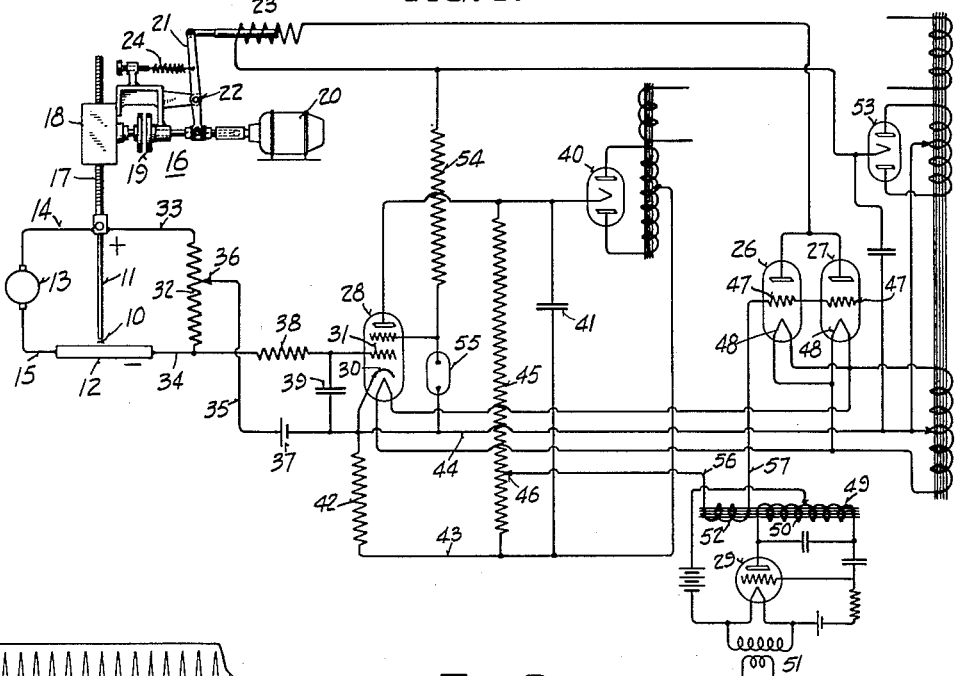
Figure 1 is a schematic drawing of an apparatus embodying the present invention.

Referring to Figure 1, 10 is a welding arc sprung between an electrode or weldrod 11 and a work piece 12. Generator 13 is arranged to supply welding current to arc 10 through leads 14 and 15.

A weldrod feeding device 16 is provided to feed the weldrod toward the arc and is represented as comprising a feed screw 17, reducing gear box 18, interruptible clutch member 19, clutch driving motor 20, clutch operating lever 21 pivoted at 22 and clutch operating solenoid 23. Solenoid 23 is biased by means of spring 24.

Heretofore the above described type of feeding device has been employed to feed a weldrod to a welding arc by having solenoid 23 connected across the arc to cause the clutch to close and feed the weldrod to the work when the arc voltage rises above a selected value.

In the present invention, an illustration of an embodiment of which is shown in Figure 1, solenoid 23 has been arranged to be fed with operating current from the plate circuits of a pair of power tubes 26 and 27. The reason for using two such tubes connected in parallel is to obtain plate current of sufficient value to operate solenoid 23.

The plate current supplied by power tubes 26 and 27 is composed of two component currents, one of which is a function of an arc characteristic and the other an alternating current of particular character.

The first of these component currents is supplied from screen grid tube 28 associated with the arc, and the second or the alternating current is illustrated as being supplied by oscillator tube 29 and its oscillating circuit connected therewith.

Screen grid tube 28 has its cathode 30 and grid 31 connected respectively to the positive and negative points of the welding arc to receive and amplify a component of the arc voltage. To obtain this component of the arc voltage a voltage dividing resistance 32 is connected across the arc by means of leads 33 and 34. The point of application of lead 35 from the cathode 30 of tube 28 to resistance 32 is at point 36 which is adjustable. This makes it posssible to apply between the grid and cathode of tube 28 the entire voltage of the arc or any proportion thereof by the adjustment of the position of point 36. Battery 37 is inserted in lead 35 and opposed to the arc voltage component impressed upon tube 28.

Thus the actual voltage impressed upon tube 28 between grid 31 and cathode 30 is the difference between the arc voltage proportion selected on resistance 32 and the battery voltage 37. By the adjustment of these two voltages, any desired sensitivity of response of tube 28 to changes in arc voltage is obtainable. Resistance 38 is inserted in the connection between the work or negative pole of the arc and grid 31. A condenser 39 is connected across the grid 31 and cathode 30. Resistance 38 and condenser 39 are so selected as to even out the arc voltage component applied to tube 28.

Oscillogram records of welding arcs show that many very rapid fluctuations of voltage occur which are of a frequency of 100 or more per second. This resistance and capacity are preferably so selected as to by-pass or eliminate all such fluctuations of 40 or more per second. This does not exclude any changes in voltage of the arc which the apparatus is capable of correcting by the resultant weldrod feed, but does exclude such incorrectible variations as might otherwise be troublesome if amplified by tube 28 and passed on to the other parts of the control equipment. Resistance 38 is also selected of a sufficiently high value to prevent the flow of excessive or detrimental positive currents from the grid 31 in the event of said grid going strongly positive.

Plate circuit current for tube 28 is supplied by a standard rectifier 40, the direct current voltage output of which is filtered by means of condenser 41. Coupling resistance 42 is connected to carry the varying plate current. This results in a varying shift of voltage difference of conductor 43 with respect to conductor 44 attached to cathode 30. Thus the voltage across voltage divider resistance 45 is shifted up and down with respect to the cathode 30 of tube 28.

A suitable point 46 on resistance 45 is connected to the grids 47 of power tubes 26 and 27. Filaments 48 of power tubes 26 and 27 are connected to have the same potential as cathode 30 of tube 28. Grids 47 thus receive a voltage with respect to filaments 48 which varies in accordance with the variations in the arc voltage fluctuations. It will be seen that an increase in arc voltage tends to decrease the plate current in tube 28, thereby decreasing the negative bias of grids 47 with respect to filaments 48 of the power tubes, and increasing the flow of current in the plate circuits thereof.

In addition to this control of the power tube plate current, there is imposed upon grids 47 an alternating voltage of a desired frequency. This alternating current is obtained in Fig. 1 by means of oscillator 29 which provides primary coil 49 of a transformer 50 with a suitable voltage. Oscillator tube 29 receives its filament heating current from transformer 51. Tube 29 and the connections form this alternating current oscillator which is of a modified Hartley type. Secondary 52 of transformer 50 is connected in series in the voltage line attached to grids 47 and thereby adds its voltage alternations to the variable bias voltage already supplied to said grids in accordance with the arc voltage.

The voltage for the plates of power tubes 26 and 27 is supplied by a rectifier 53, the negative of which is connected to the filaments 48 of these power tubes and also to the cathode of tube 28. The positive terminal of this voltage rectifier 53 is connected to the plates of the power tubes through solenoid coil 23 which serves to engage and disengage the clutch 19 of the weldrod feeding device 16.

The screen grid of tube 28 is provided with a relatively constant voltage with respect to its cathode by connections from rectifier 53 through resistance 54 and across neon tube 55. Neon tube 55 has the characteristic of substantially constant voltage with varying current therethrough. Line voltage variations are thereby substantially excluded from application to the screen grid.

The action of the control device of Fig. 1 is as follows. Contact 36 is adjusted to maintain the voltage of arc 10 at say 36 volts. If the arc voltage drops materially below this value, the decreased feeding rate of electrode 11 is accomplished automatically by the device. The decreased voltage lowers the negative bias of tube grid 31, thereby increasing the plate current and the voltage drop through resistance 42. This in turn increases the negative bias on grids 47 and decreases the power current in clutch coil 23. When this current is sufficiently lowered to permit spring 24 to open clutch 19, the feed of rod 11 ceases, the arc lengthens and the voltage rises.

The A. C. voltages imposed upon grids 47 cause the current of coil 23 to rise and fall periodically. Thus when the arc voltage conditions are reasonably near those desired, every rise will close the clutch and feed the weldrod to the arc, and every drop in this current will open the clutch and stop the feed of the electrode.

It will be seen that as the arc voltage rises, the proportionate amount of the time consumed in feeding the electrode increases, and, if the voltage becomes sufficiently high, even the minimum of the clutch coil varying current values are always great enough to hold the clutch in driving contact. This gives the maximum rate of feed. If the arc is short enough and the voltage correspondingly low, the clutch coil current will always be too weak to throw the clutch in against spring 24 and no feed of the weldrod occurs and the arc lengthens by burning away of the electrode.

In between the above two conditions, the clutch is always vibrating in and out at a constant rate which is the frequency of alternation to which the oscillator 29 is adjusted.

Figure 2:
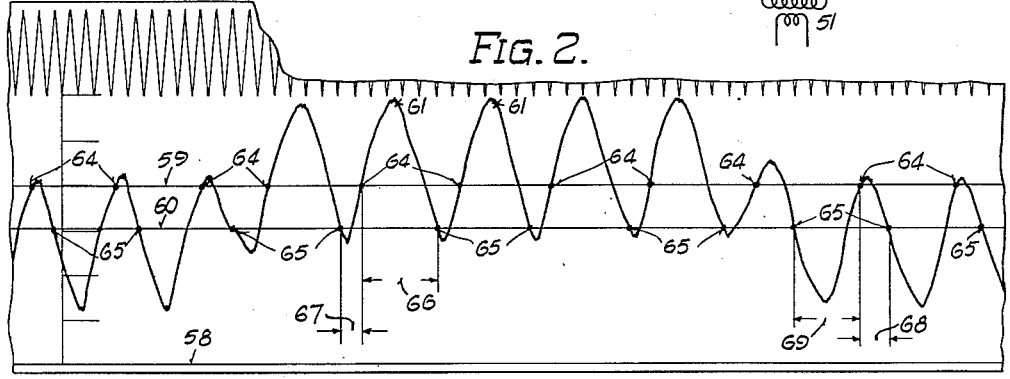
Fig. 2 is an oscillogram showing the currents in the cultch coil of the apparatus when operating.
Figure 3:
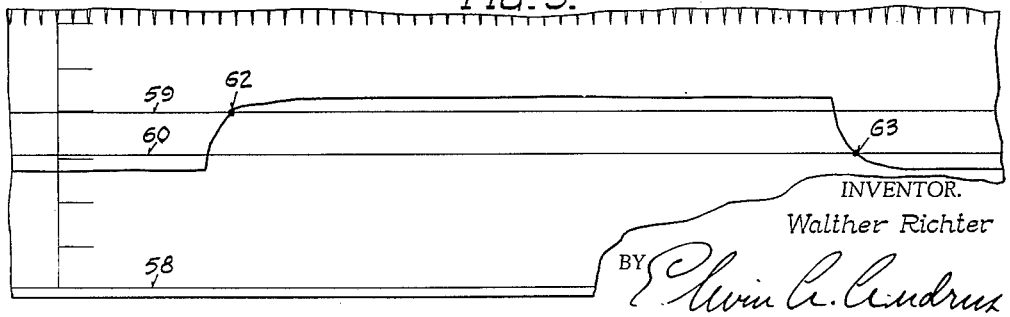
Fig. 3 is an oscillogram similar to that of Fig. 2 when a portion of the apparatus is shorted out.

Fig. 2 is a reproduction of an oscillogram depicting values of the current in the clutch coil 23 and was obtained by suddenly changing the voltage as at the arc 10. Fig. 3 is a view similar to Fig. 2 and represents the value of the clutch coil current under similar conditions, except that when the record depicted in Fig. 3 was taken, points 56 and 57 of Fig. 1 were short circuited, thereby suppressing the alternating voltage theretofore impressed upon grids 47.

In Figs. 2 and 3, line 58 represents the zero value of current in the clutch coil 23, line 59 represents the value of the current needed to close the clutch and line 60 the current at which the clutch is released. The abscissas represent time elapse. The time of an oscillation in Fig. 2, as for instance between points 61, is about $\tfrac{1}{60}$ second as shown by the 60-cycle timing wave shown at the top of the figure. The slow rise and fall of the main unidirectional current in both Figs. 2 and 3 is due to the inductance of the coil 23.

In Fig. 3, upon the rise in the clutch current to point 62, the clutch engages and upon the decrease of the current to point 63, the clutch disengages, giving one long feeding application. In Fig. 2, which represents the operation of the combined apparatus, the clutch engages repeatedly at points 64 and disengages repeatedly at points 65, giving a series of feeding applications.

It will be noted in Fig. 2 that when the average clutch current is high, the time of feeding as at 66 is large with respect to the time of no feeding as at 67. When the main current is low, the time of feeding as at 68 is less than before, while the time of no feeding has increased as at 69.

Thus as the voltage in the arc rises or falls, the main D. C. current in the clutch coil rises or falls accordingly, and the proportional amount of time during which feeding takes place increases or decreases respectively. This results in a greater average rate of feed of the weldrod as the voltage of the arc increases. This has a correcting effect upon the condition of the arc.

The operation of the device is extremely sensitive, having substantially no hunting, lost motion or evidences of inertia in its action.

The voltage setting may be adjusted by positioning the point 36 on resistance 32 and also by the tensioning of spring 24 of feeding device 16. The frequency per second of the oscillating voltages imposed on grids 47 has been found suitable at a value of approximately 6 to 10. However, this may vary. If the inertia of the clutch and solenoid is small, a more frequent vibration is satisfactory.

The rapid vibratory clutch action eliminates the effects of lost motions, inertias, etc. and produces a very smooth, accurate feed and control of the arc conditions.

I claim:

1. An arc welding control device comprising a clutch operated weldrod feeding mechanism, electric current operated means for opening and closing said clutch, and combined means to impress upon said clutch operating means a current composed of two components, one of which is graduated in accordance with a varying arc characteristic and the other of which is an alternating one of predetermined amplitude and frequency so selected that the clutch is caused to open and close regularly in accordance with the alternations of said alternating component while the said arc acharacteristic is in the vicinity of the desired value of said characteristic.

2. An arc welding control device comprising a weldrod feeding mechanism, electric operated means to start and stop said feeding device, and means to provide an electric current for the operation of said first named means, one component of which current is graduated in accordance with a varying arc characteristic, and another component of which is an alternating component of predetermined amplitude and frequency so selected that said combined current acts to start and stop said feeding device regularly in accordance with the alternations of said alternating component within a certain range of desired arc characteristic.

3. In an arc welding control device, the combination of an electrically controlled welding electrode feeding device, electronic power tubes connected to provide current to start and stop said feeding device, an electronic amplifying tube connected to exert a control upon the current supplied by said power tubes in accordance with a characteristic of the welding arc, and means for impressing upon said current an alternating current value of a predetermined frequency and magnitude so selected to cause said feeding device to start and stop in a succession of vibrating actions in accordance with the alternations of said alternating current.

4. In an arc welding control device, the combination comprising an interruptible means for feeding an electrode to the arc, means to supply a unidirectional electrical current to effect an interruption of said feeding as the arc becomes shorter than desired and initiate said feeding when said arc becomes longer than desired, and means to impose upon said current an uninterrupted alternating component of a predetermined frequency so selected to produce a rapid succession of short feeding impulses in accordance with the alternations in said alternating component.

5. In an arc welding control device, the combination comprising, means for feeding an electrode to the arc, means for controlling said feed by an electric current, and means to provide by electronic control the current for said feed control, said current having a unidirectional component which rises and falls in value in accordance with the change in the average arc condition to be controlled and an impressed alternating component of predetermined frequency to cause the feeding of said electrode in a sustained succession of impulses in accordance with the alternations in said alternating component to eliminate hunting and other objectionable characteristics of feeding operations.

WALTHER RICHTER.